United States Patent
Ball et al.

(10) Patent No.: US 7,214,901 B1
(45) Date of Patent: May 8, 2007

(54) DUPLEX ELECTRICAL DISCHARGE MACHINING

(75) Inventors: Glenn Edward Ball, Madisonville, KY (US); Mark Joseph Gleason, Madisonville, KY (US); Barry Joe Webb, Manitou, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/333,428

(22) Filed: Jan. 17, 2006

(51) Int. Cl.
*B23H 9/10* (2006.01)
*B23H 9/14* (2006.01)
*B23H 7/26* (2006.01)
*B23H 1/04* (2006.01)

(52) U.S. Cl. .............. 219/69.17; 219/69.15; 219/69.2

(58) Field of Classification Search ............ 219/69.14, 219/69.15, 69.17, 69.2, 69.11
See application file for complete search history.

(56) References Cited

U.S. PATENT DOCUMENTS

| | | | |
|---|---|---|---|
| 4,197,443 A | 4/1980 | Sidenstick | |
| 4,476,369 A * | 10/1984 | Inoue | 219/69.17 |
| 4,705,932 A | 11/1987 | Aso et al. | |
| 4,762,464 A | 8/1988 | Vertz et al. | |
| 4,804,814 A | 2/1989 | Southerland et al. | |
| 5,019,683 A | 5/1991 | Abdukarimov et al. | |
| 5,893,984 A | 4/1999 | Thompson | |
| 6,127,642 A | 10/2000 | Gleason et al. | |
| 6,354,797 B1 | 3/2002 | Heyward et al. | |
| 6,373,018 B1 * | 4/2002 | Wei et al. | 219/69.11 |
| 6,759,621 B2 * | 7/2004 | Varin | 219/69.15 |
| 7,015,411 B2 * | 3/2006 | Meister et al. | 219/69.2 |
| 7,041,933 B2 * | 5/2006 | Forrester et al. | 219/69.17 |
| 2004/0200807 A1 * | 10/2004 | Forrester et al. | 219/69.17 |

FOREIGN PATENT DOCUMENTS

| | | | |
|---|---|---|---|
| JP | 63-28525 A | * | 2/1988 |
| JP | 3-86429 A | * | 4/1991 |
| JP | 2001-170820 A | * | 6/2001 |
| WO | WO-86/00840 A1 | * | 2/1986 |

OTHER PUBLICATIONS

CurrentEDM.com, "EDM Drill Models," wwww, Dec. 2, 2005, 4 pages.

* cited by examiner

*Primary Examiner*—Geoffrey S. Evans
(74) *Attorney, Agent, or Firm*—Theodore P. Cummings; Francis L. Conte

(57) ABSTRACT

An electrical discharge machine includes first and second coaxial electrodes and corresponding carriages. A liquid dielectric is channeled between the electrodes and a workpiece which are suitably electrically powered for machining a duplex hole in the workpiece.

33 Claims, 4 Drawing Sheets

DUPLEX ELECTRICAL DISCHARGE MACHINING

BACKGROUND OF THE INVENTION

The present invention relates generally to electrical discharge machining (EDM), and, more specifically, to EDM drilling.

Electrical discharge machining is a process in which a cathodic electrode is positioned atop an electrically conducting workpiece, and a liquid dielectric is channeled therebetween. Electrical current passes between the electrode and workpiece and locally erodes the workpiece for machining thereof. In a typical application, the electrode may be used for drilling a hole of any desired shape in the workpiece.

For example, many gas turbine engine components include small holes therein through which cooling air is channeled during operation. The holes are small in diameter and typically range from 10–80 mils (0.2–2.0 mm), and require a slightly smaller diameter EDM electrode.

The narrow electrodes are consumed during machining, and are therefore initially relatively long in length which typically ranges from about 12–16 inches (30–41 cm) for obtaining a useful life during drilling.

Furthermore, the electrodes are typically tubular for channeling the liquid dielectric therethrough during operation. Accordingly, the hollow, slender electrodes are relatively flexible in bending along their longitudinal axes. Such flexibility is typically not desirable since it adversely affects the accuracy and repeatability of EDM drilling.

More specifically, the electrode tip must be accurately maintained at a small clearance gap of about 1 mil (0.025 mm) with the workpiece to effect suitable electrical discharge machining without experiencing an undesirable electrical short circuit therewith.

Accordingly, the electrode tip is typically mounted through a lower guide that accurately maintains a side clearance around the electrode as it drills through the workpiece. And, the opposite or top end of the electrode is held in a conventional electrode holder which is effective for translating the electrode downwardly toward the workpiece during operation, and for maintaining the small clearance gap vertically therebetween.

In this way, the lower tip guide and the upper electrode holder accurately support both ends of the electrode for maintaining the desired gap both laterally around the electrode tip and vertically between the tip and the workpiece during the EDM operation.

However, the electrodes have a maximum length at the beginning of the drilling operation, with corresponding maximum flexibility, and are consumed during drilling which decreases their length and flexibility correspondingly.

Electrode flexibility becomes one problem due to the substantially high pressure of the dielectric channeled therethrough. Dielectric pressures up to about 50 atmospheres are conventional and produce a jet of dielectric discharge from the electrode tip against the workpiece as a hole is drilled.

The electrode correspondingly experiences a reaction force which acts in compression therethrough. Since the electrode is a slender rod or column, it is subject to compressive buckling loads which can cause lateral deflection of the electrode that correspondingly shortens its effective length and withdraws the electrode tip slightly away from the workpiece, and affects EDM performance.

Although tubular electrodes are nevertheless efficient in forming cylindrical holes in turbine components, improved turbine cooling can be obtained with more complex hole configurations. For example, turbine nozzle vanes and rotor blades have thin walled airfoils typically including a multitude of film cooling holes extending therethrough.

The airfoils have elaborate internal cooling circuits for cooling the inside thereof during operation in the hot combustion flowpath, with the spent internal cooling air being discharged through the film cooling holes to form thin layers of air on the external surface of the airfoil for providing thermal insulation against the hot combustion gases. Since the film cooling air is discharged under pressure, small jets of air are developed and adversely affect the formation of a continuous external air film.

A significant improvement in film cooling design includes a diffusion hole typically having a cylindrical inlet and a diverging outlet that diffuses the jet of cooling air and correspondingly reduces the discharge velocity thereof. Diffusion film cooling holes improve the performance of the external thermally insulating air film.

However, diffusion holes have complex configurations and cannot be formed by the simple tubular EDM electrode commonly used for cylindrical film cooling holes. Instead, a specifically configured EDM electrode is required for machining the complex diffusion hole, but EDM wear of the electrode becomes more of a problem. As the complex electrode wears it is not conveniently repairable, and must be replaced in whole.

A typical form of the diffusion electrode is a comb having a row of identical fingers configured for simultaneously forming the small inlet and diverging outlet of each diffusion whole.

The EDM comb electrodes may be economically manufactured in a stamping process, but nevertheless the combs wear during operation and must be replaced in whole. Furthermore, the comb requires parallel fingers which in turn requires identical orientation of the resulting film cooling holes.

However, modern gas turbine engine design may include a multitude of film cooling holes having different configurations around the external surface of the airfoils between the leading and trailing edges thereof, and it may be desirable to vary the configuration of the holes along both the radial or longitudinal span of the airfoils and axially along the chords.

Conventional EDM electrodes and apparatus therefor lack the versatility to economically drill or machine a multitude of film cooling holes having different orientations and different diffusion configurations.

Accordingly, it is desired to provide an improved EDM apparatus and process for drilling complex diffusion film cooling holes in workpieces such as turbine airfoils.

BRIEF DESCRIPTION OF THE INVENTION

An electrical discharge machine includes first and second coaxial electrodes and corresponding carriages. A liquid dielectric is channeled between the electrodes and a workpiece which are suitably electrically powered for machining a duplex hole in the workpiece.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
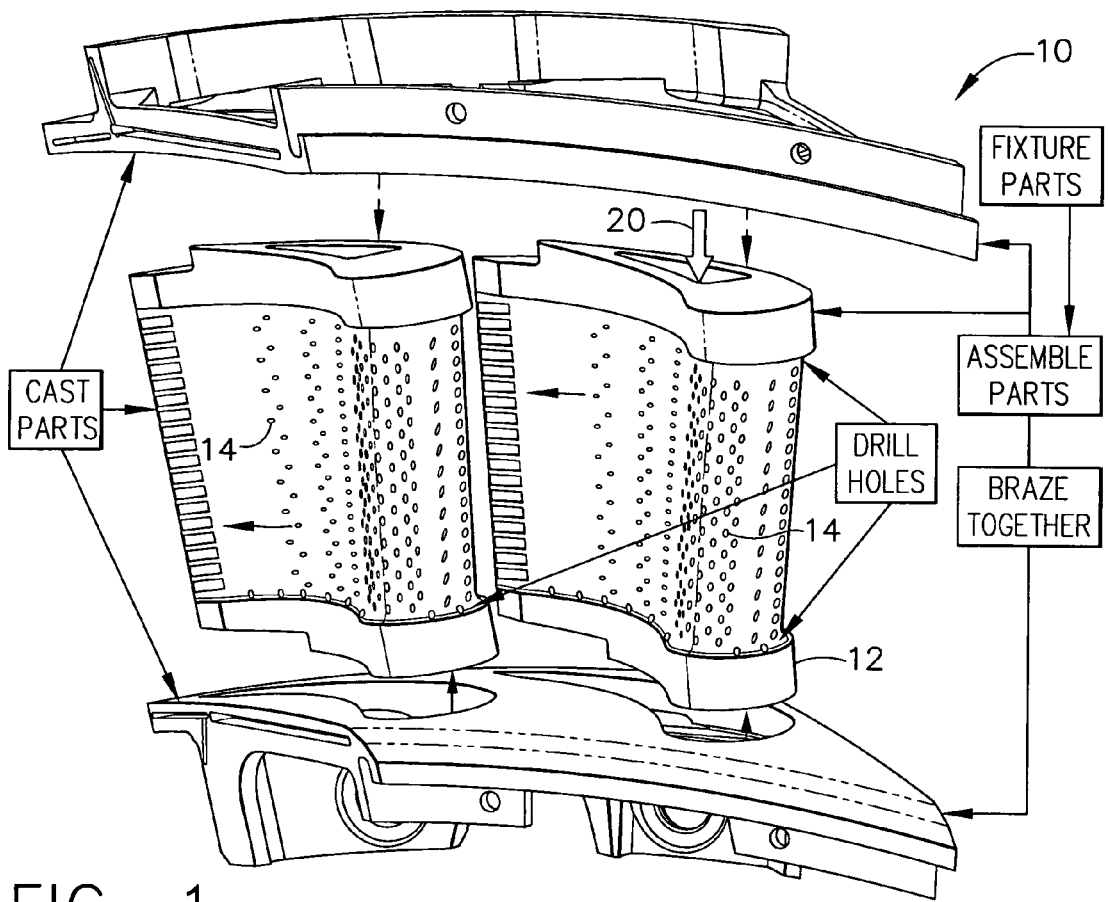
FIG. 1 is a schematic view of the manufacture of an exemplary gas turbine engine turbine nozzle having airfoils with a multitude of film cooling holes therein.

Illustrated schematically in FIG. 1 is an exemplary method of making a doublet segment of annular gas turbine engine high pressure turbine nozzle 10. The nozzle includes a pair of nozzle vanes 12 having typical airfoil configurations including a generally concave pressure side and an opposite, generally convex suction side extending axially in chord between opposite leading and trailing edges.

The vanes 12 extend in radial span between corresponding outer and inner band segments, which components are initially cast in a conventional manner and then assembled together and brazed to form a unitary assembly of the four parts.

Each vane 12 is initially cast hollow with a solid sidewall through which a multitude of film cooling holes 14 are typically drilled in corresponding rows along the longitudinal or radial span of each airfoil, and typically along both the pressure and suction sides thereof.

Figure 2:
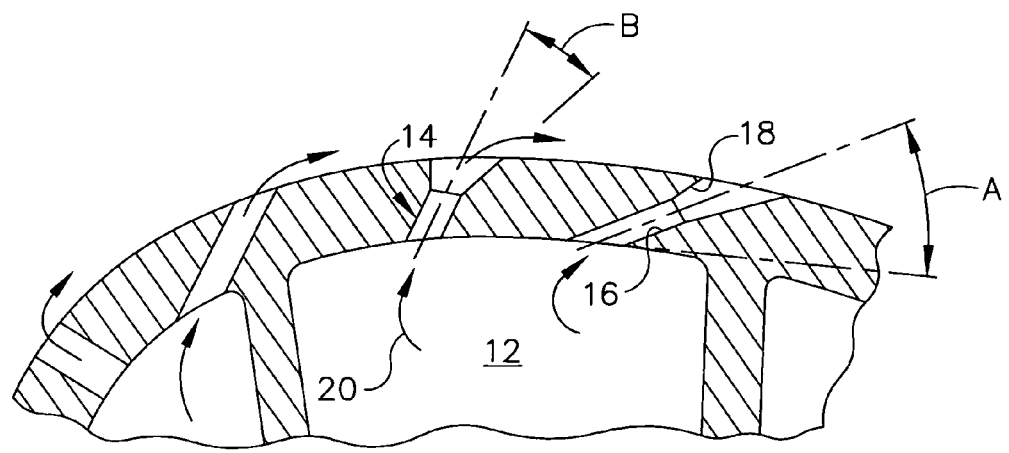
FIG. 2 is an enlarged sectional view through a portion of one of the airfoils illustrated in FIG. 1 showing exemplary forms of film cooling holes drilled therein.

FIG. 2 illustrates exemplary configurations of some of these film cooling holes 14 which may be straight cylindrical holes inclined through the airfoil sidewalls at various inclination angles A both in the chord direction and in the span direction. Some of the film cooling holes are configured as diffusion holes having a cylindrical inlet 16 disposed on the inside of the vane, and a coaxial diverging, larger outlet 18 exposed on the outside of the vane.

During operation in the gas turbine engine, pressurized cooling air 20 is suitably channeled through internal cooling circuits within each vane 12 and discharged through the various rows of film cooling holes 14 for providing a film cooling layer of air on the external surfaces thereof for thermal protection from the hot combustion gases which flow thereover during operation.

The diffusion film cooling holes illustrated in FIG. 2 are typically straight with a longitudinal or centerline axis inclined at the suitable inclination angle A relative to the thin sidewall of the vane. The inclination angle A is typically about 15 degrees and may have compound components both along the axial chord of the vane and the radial span of the vane.

The inlet 16 is typically cylindrical with a constant circular flow area along its finite length, which may be about half the wall thickness. The outlet 18 diverges in flow area from the smaller inlet 14, and is typically symmetrical with a divergence angle, or half angle, B which is typically up to about eight degrees for promoting diffusion of the discharged cooling air without undesirable flow separation thereof.

As indicated above, the various film cooling holes in the exemplary vane workpieces 12 illustrated in FIGS. 1 and 2 may be conventionally manufactured by electrical discharge machining (EDM) using conventional machines therefor which are commercially available from various sources. The cylindrical film cooling holes are readily manufactured using tubular EDM electrodes.

However, the diffusion film cooling holes 14 are substantially more complex and are typically manufactured using EDM comb electrodes as described above which maintain identicality between the holes formed by the comb, as well as maintain the same angular orientation of the row of holes corresponding with the comb.

It is therefore desired to provide a more versatile EDM apparatus and process for economically drilling the diffusion holes 14 at various angles of inclination A, and at different orientations from hole to hole as desired.

Figure 3:
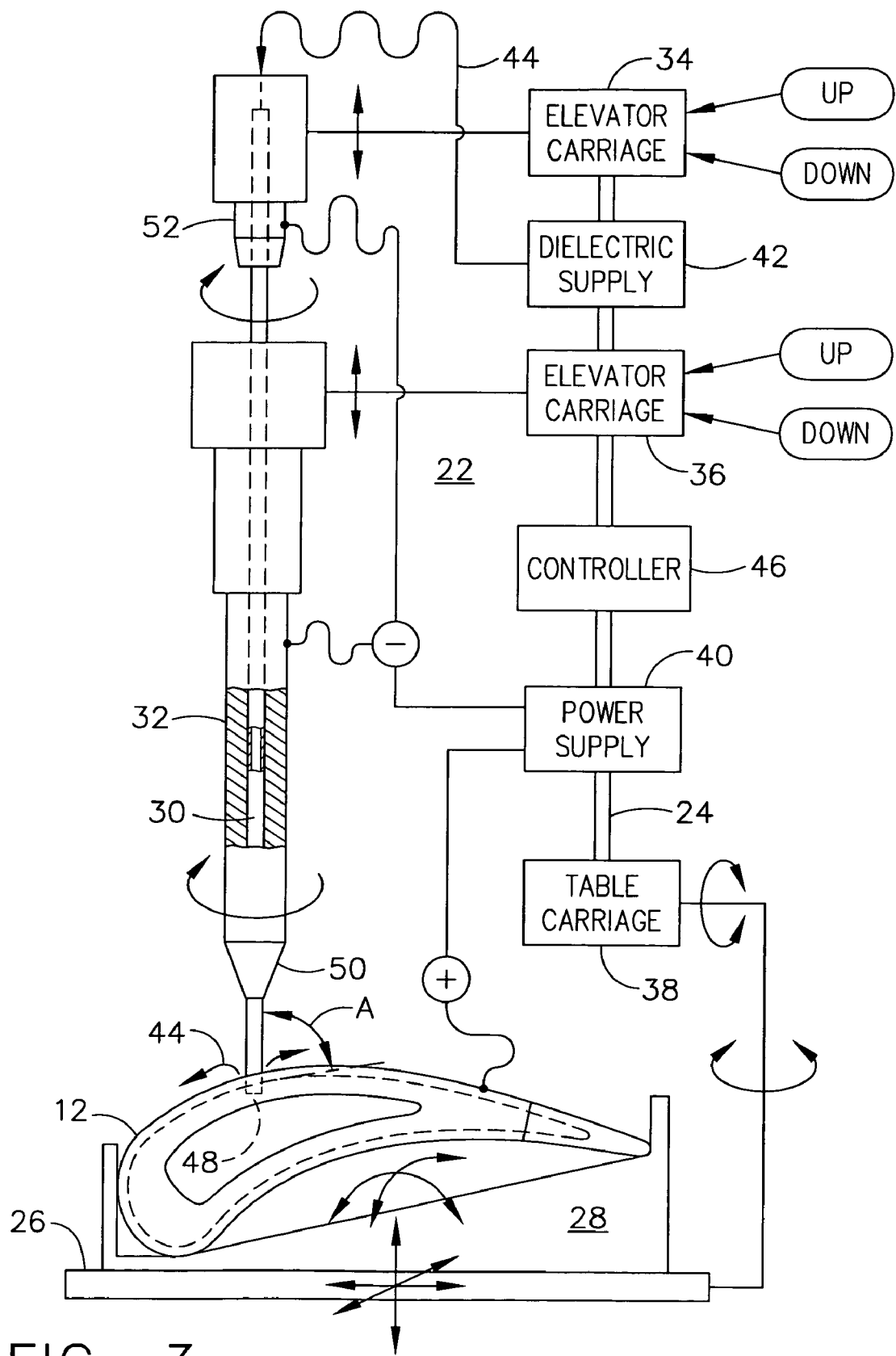
FIG. 3 is a schematic view of an electrical discharge machine having coaxial electrodes for drilling the duplex holes illustrated in FIG. 2.

Illustrated schematically in FIG. 3 is an electrical discharge machine 22 specifically configured for drilling the complex diffusion holes 14 illustrated in FIG. 2 in the initially solid wall workpiece vane 12 following casting thereof.

The machine 22 includes a basic frame 24 upon which all of its components may be conveniently supported. For example, the frame 24 includes a table 26 suitably configured for mounting a fixture 28 thereon, with the fixture being specifically configured for rigidly mounting the intended workpiece 12, such as the exemplary turbine nozzle vane.

The machine uniquely includes duplex electrodes 30,32 which are nested coaxially or concentric with each other for electrical discharge machining of the corresponding diffusion, or duplex, holes 14 illustrated in FIG. 2. The first EDM electrode 30 is hollow or tubular and mounted in a suitable first elevator carriage 34 that provides means for vertically translating the first electrode relative to the supporting frame 24 and table 26.

The second EDM electrode 32 is also hollow or tubular and is mounted in a corresponding second elevator carriage 36 that provides means for vertically translating the second electrode relative to the common frame 24 from which it is supported. The two electrodes are coaxial or concentric with each other, and therefore share the common axial alignment thereof and precise positioning thereof relative to the workpiece 12 fixedly mounted on the supporting table 26.

The table 26 itself is suitably mounted in a third or table carriage 38 that preferably includes multiple movement axes as desired to provide means for translating or rotating, or both, the table to precisely position or intermittently index the workpiece 12 at any desired three dimensional orientation in space relative to the duplex electrodes 30,32, which themselves are preferably mounted for simple vertical translation only.

In this way, the electrodes may be positioned relative to the workpiece 12 supported on the table 26 at a compound angle of inclination A between the external surface of the workpiece and the common longitudinal or centerline axis of the concentric electrodes 30,32.

The three carriages 34,36,38 may have any conventional configuration typically found in commercially available EDM machines, which machines may be modified in accordance with the teachings herein for providing the desired movements of the new duplex electrodes relative to the mounted workpiece.

The EDM machine 22 also includes a suitable electrical DC power supply 40 having electrical leads suitably joined to the workpiece 12 as an anode (+), and the two electrodes 30,32 as cathodes (−) to provide means for electrically powering these components for effecting EDM in accordance with conventional practice.

In this regard, the machine also includes a conventional dielectric supply 42 operatively joined through suitable conduits and pumps to at least the first electrode 30 to provide means for channeling through the centerbore thereof a liquid dielectric 44 under substantial pressure, such as up to about 50 atmospheres.

A suitable electrical controller 46, such as the typical computer numerical controller (CNC), is suitably mounted in the machine to provide means for controlling the entire operation thereof. For example, the controller 46 is electrically joined to the three carriages 34,36,38 and configured in suitable software to have the technical effect of translating the two electrodes 30,32 into the workpiece 12 in coordinated motion for EDM drilling the duplex hole therein at any suitable compound angle A of inclination desired.

The basic EDM process itself is well known and conventional and provides electrical power between an electrode and workpiece, with a liquid dielectric being channeled under pressure therebetween. The electrical power causes electrical erosion of material from the workpiece, which in turn creates the desired hole therein. A relatively small gap is maintained between the electrode and the workpiece in which the dielectric flows and through which electrical energy is carried for performing the EDM process. Substantial heat is generated during EDM drilling and is removed by the continuous flushing action of the dielectric liquid.

However, the EDM machine 22 illustrated schematically in FIG. 3 is unique for its use of not only a single electrode or comb electrode, but the duplex electrodes 30,32 mounted concentrically along a common centerline axis and axis of translation relative to the workpiece 12, with the desired compound angle of inclination A relative thereto.

The first electrode 30 illustrated in FIG. 3 has a conventional slender and tubular configuration commonly used for drilling small cylindrical film cooling holes in turbine airfoils. Correspondingly, the second electrode 32 is also tubular and concentrically surrounds the first electrode. In this way, the first electrode is disposed and laterally guided concentrically inside the second electrode 32 with a relatively small side clearance therebetween.

Figure 4:
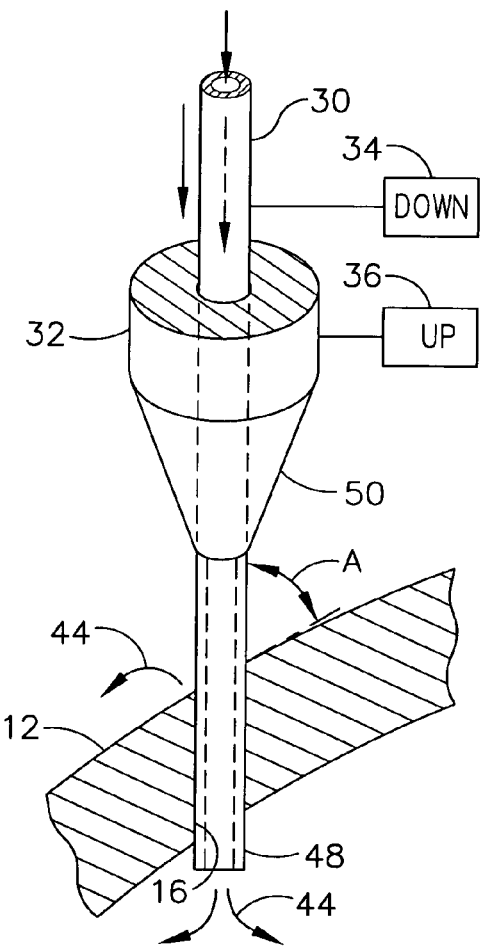
FIG. 4 is a schematic view of the distal end portions of the two electrodes illustrated in FIG. 3 during drilling of an initial cylindrical hole in the airfoil workpiece.

As shown in FIG. 4, the first electrode 30 has a plain or blunt cylindrical first distal end 48, whereas the second electrode 32 has a different, second, distal end 50, which is larger in diameter than the first end 48, and preferably converges.

As initially shown in FIG. 4, the configuration of the first electrode 30 is selected for EDM drilling a cylindrical hole corresponding with the desired cylindrical inlet 16 illustrated in FIG. 2. Correspondingly, the second electrode 32 as illustrated in FIG. 5 is configured for EDM drilling a larger diverging hole corresponding with the desired diverging outlet 18 illustrated in FIG. 2, with the resulting duplex hole 14 being coaxial due to the coaxial and concentric nesting of the duplex electrodes 30,32.

The first electrode 30 may be formed of any conventional EDM electrode material such as brass or copper. The second EDM electrode 32 may also be formed of any suitable EDM material such as brass, or copper, or copper-tungsten for its enhanced durability.

The first electrode 30 is substantially longer than the second electrode 32, both for being consumed during the EDM process, as well as being supported by and extending through the shorter length second electrode 32 as illustrated in FIG. 3.

Figure 5:
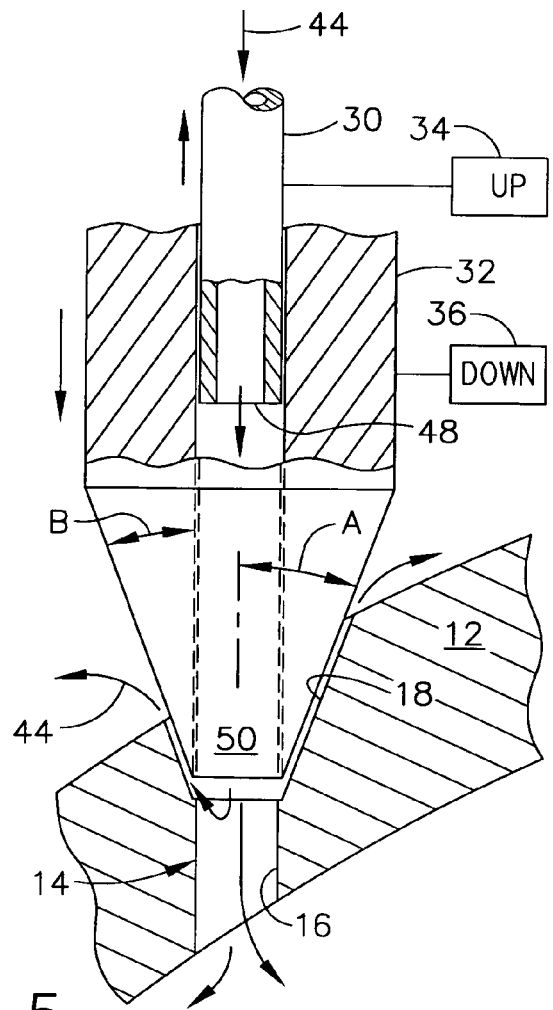
FIG. 5 is a schematic view of the distal ends of the two electrodes during drilling of the diverging outlet coaxially with the predrilled cylindrical inlet.

The distal end 50 of the second electrode 32 may have any suitable configuration for forming the complementary larger or diverging outlet 18 in the workpiece 12 illustrated in FIGS. 2 and 5. For example, the distal end 50 of the second electrode may simply be an axisymmetrical cone converging or sloping with an inclination half angle B matching that of the diverging angle B for the desired diverging outlet 18 illustrated in FIG. 2.

As shown in FIG. 5, the conical distal end 50 decreases in diameter along the aft end of the electrode and terminates in a small diameter internal bore through which the cylindrical first electrode 30 is translated for EDM drilling as illustrated in FIGS. 3 and 4.

The EDM machine 22 illustrated schematically in FIG. 3 may otherwise be conventional except for the introduction of the coaxial second electrode 32 and its translation carriage 36. In particular, the first and second carriages 34,36 are preferably configured for independent coaxial translation of the first and second electrode 30,32, respectively under automated control of the CNC controller 46.

For example, the controller 46 may be configured in suitable software for automatically and sequentially translating the first and second electrodes 30,32 into the common workpiece 12 to EDM machine or drill the desired duplex holes 14 in corresponding stages or steps.

The conventional EDM machine having only a first cylindrical electrode 30 mounted therein is suitably configured in software for automating the drilling process of a multitude of conventional cylindrical film cooling holes in the exemplary airfoil workpiece 12. The machine is suitably set up to accurately position the workpiece 12 on the supporting table 26 relative to the first electrode 30. This provides an accurate reference datum in three dimensional space to accurately position and precisely drill cylindrical holes at the desired compound inclination angle A through the sidewall of the airfoil workpiece.

By modifying the otherwise conventional EDM machine 22 to include the second electrode 32 and its movement carriage 36, the larger outlet hole 18 illustrated in FIG. 5 may be accurately machined coaxially with the cylindrical inlet hole 16 in coaxial alignment therewith using the centerline axis of the first electrode 30 as a guide and reference line.

In the preferred embodiment illustrated schematically in FIGS. 3–5, the controller 46 is configured in suitable software to have the technical effect of first translating the first electrode 30 into the workpiece 12 to first drill the cylindrical inlet hole 16 therein. In sequence then, the controller is also effective for secondly translating the second electrode 32 coaxially about the first electrode 30 into the predrilled cylindrical hole 16 to secondly drill the coaxial diverging outlet hole 18 in the workpiece 12 to form the desired duplex or diverging hole 14 extending therethrough.

Since the two electrodes 30,32 illustrated in FIG. 3 are mounted coaxially in the independent elevator carriages 34,36, the two electrodes may be operated in any desired sequence for collectively forming the desired hole in the workpiece.

As shown in FIGS. 3 and 4, the second electrode 32 is elongate and larger in diameter than the first electrode and includes a centerbore that laterally supports a majority of the length of the first electrode suspended below the first carriage 34. The second electrode 32 then functions as a lateral guide to accurately support the sides of the long, slender first electrode 30 as the first carriage 34 is operated to drive the first distal end 48 downwardly (down) into the workpiece for first drilling the cylindrical hole therein. Correspondingly, the second carriage 36 is operated to maintain in an up position the second electrode 32 to prevent any EDM interaction between its distal end 50 and the workpiece when the first electrode 30 is drilling the inlet 16.

Upon completion of drilling the cylindrical hole 16 through the workpiece 12 shown in FIG. 4, the controller then reverses the vertical positions of the first and second electrodes 30,32 as illustrated in FIG. 5. In the second sequence of machining, the first electrode 30 is maintained in its up position by the first carriage 34 to prevent EDM interaction between its distal end 48 and the workpiece.

In contrast, the second electrode 32 is translated downwardly (down) by the second carriage 36 to drill the diverging hole 18 coaxially with the predrilled cylindrical hole 16. Translation of the second electrode 32 over the first electrode 30 ensures accurate alignment of the diverging hole 18 with the cylindrical hole 16 sharing a common centerline axis at the desired compound angle of inclination A relative to the workpiece.

In alternate embodiments, the second electrode 32 may be lowered first to drill its diverging hole 18, followed in turn by lowering of the first electrode 30 to drill its cylindrical hole 16. Or, the two electrodes 30,32 may even be lowered simultaneously together to form the duplex hole 14 in a common EDM drilling operation.

Common to the duplex EDM drilling process is the coaxial translation of the nested electrodes 30,32 into the common workpiece 12. The liquid dielectric 44 is conveniently channeled under pressure through the inner electrode 30 in a conventional manner to feed the working gap between both electrodes and the workpiece during operation. In FIG. 4, the dielectric 44 is discharged from the distal end 48 of the first electrode 30 under substantial pressure and leaks past the external surface of the first electrode 30 in the small clearance or gap maintained between the electrode and the cylindrical hole 16 as it is formed.

In FIG. 5, the dielectric 44 is still discharged through distal end 48 of the elevated first electrode 30 to feed the centerbore of the outer electrode 32, with the dielectric being discharged through the open bore in its conical distal end 50 under substantial pressure to yet again leak past the external surface of the second electrode in the small clearance or gap maintained with the workpiece during the EDM drilling process.

In the preferred embodiment illustrated in FIG. 3, the EDM machine 22 also includes a motor driven rotary chuck 52 mounted to the first carriage 34 for supporting the proximal end of the long first electrode 30. The chuck is operatively joined to the controller 46 and provides means for spinning the first electrode 30 at a suitable rotary speed during drilling of the cylindrical portion of the duplex hole.

This spinning configuration of the first electrode is conventional for both distributing wear around the circumference of the distal end of the first electrode during drilling, as well as distributing the heat loads generated during operation. As the first electrode drills cylindrical holes in sequence, it is consumed in length from its distal end until replacement is required.

Correspondingly, the second electrode 32 may be similarly rotary mounted in the second carriage 36 to spin the second electrode 32 during EDM drilling of the diverging hole 18 if desired. For the conical distal end 50 configuration, the second electrode may undergo spinning for similar benefits to spinning the first electrode 30, but at the added complexity of the requisite spinning hardware.

However, in the preferred embodiment illustrated in FIG. 5, the second electrode 32 is fixedly mounted to the second carriage 36 to prevent spinning of the second electrode 32 during the EDM drilling of the duplex hole.

A non-spinning second electrode 32 decreases the complexity of the EDM machine, and may also offer advantages in precise positioning of the diverging hole 18 in the workpiece, especially for different converging forms of the cutting distal end 50 of the second electrode 32.

As indicated above, the cylindrical first electrode 30 is conventional in configuration and is consumed at its cutting distal end 48 during EDM drilling. However, spinning the first electrode 30 during EDM drilling maintains an accurate cutting end of the electrode until the available cutting length of the electrode is consumed.

In contrast, the second electrode 32 illustrated in FIG. 3 has a specifically configured, converging distal end 50 of limited length which is also consumed during EDM drilling, but does not have the self-renewing attribute of the plain cylindrical first electrode. The converging distal end 50 of the second electrode is preferably disposed at the distal end of a common diameter shank, which shank is in turn integrally joined to a larger diameter supporting hub suitably mounted to the second carriage 36.

The second electrode 32 is larger in diameter than the slender first electrode 30 mounted concentrically in the centerbore thereof and provides a rigid and accurate supporting guide for the spinning first electrode 30 during its drilling operation, and restrains lateral flexing thereof.

Figure 6:
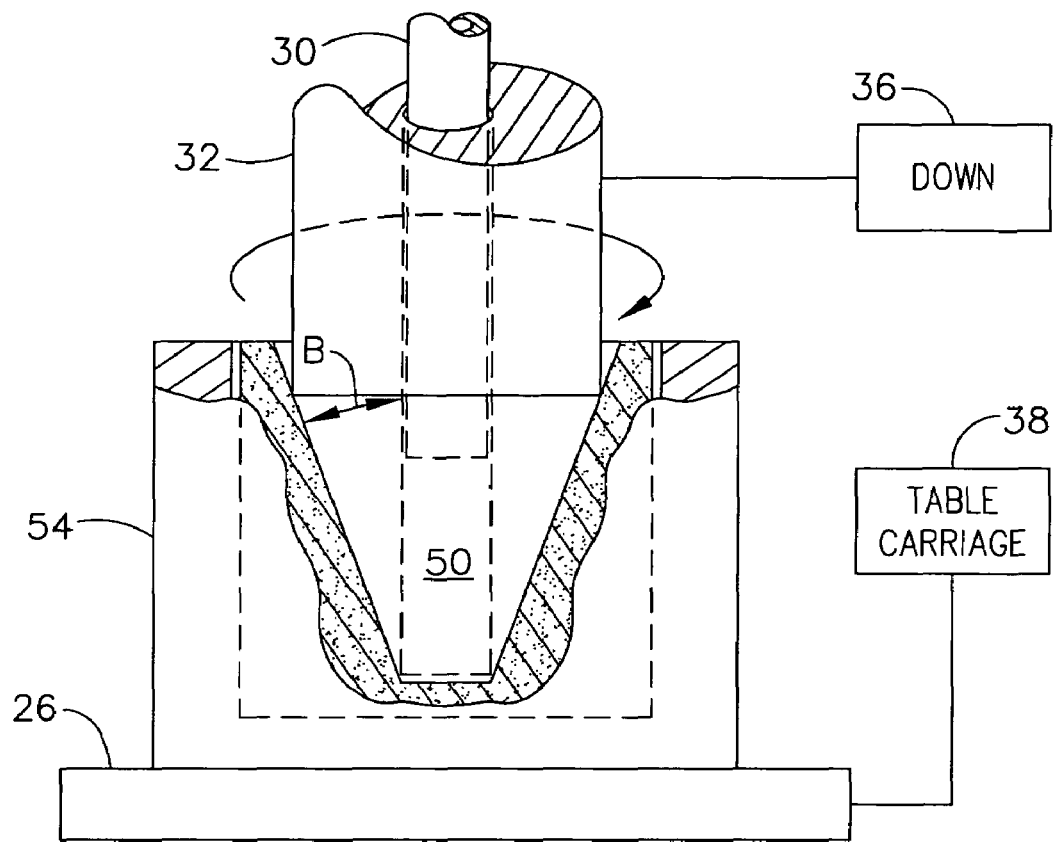
FIG. 6 is a schematic view of a rotary grinder for dressing the conical electrode illustrated in the previous figures.

FIG. 6 illustrates schematically a motorized dressing wheel or grinder 54 which may be conveniently mounted to the common supporting table 26 of the machine for periodically dressing the converging distal end 50 of the second electrode 32 while still supported in the machine around the first electrode 30. The grinder includes a wheel having a grinding cone therein matching the desired half angle B of the second distal end 50.

As the distal end 50 wears during the EDM drilling process, the motorized grinder 54 may be suitably translated periodically into position under the second electrode 32 and operated to grind or dress the distal end 50 to return it to the desired converging configuration thereof.

The grinder 54 is preferably motorized itself where the EDM machine is configured without spinning capability for the second electrode 32. However, if the machine itself has spinning capability for the second electrode 32, the grinder 54 need not be motorized, but may include a fixed conical grinding wheel therein against which the second distal end 50 is rotated for dressing.

A particular advantage of the duplex EDM machine 22 illustrated in FIG. 3 is the duplex arrangement of the two electrodes 30,32 to collectively EDM drill the complex duplex hole 14 with the cylindrical inlet 16 and diverging outlet 18 as illustrated in FIGS. 2 and 5. The machine may be automated to sequentially drill a multitude of duplex holes in the common airfoil workpiece 12, with the duplex holes 14 being spaced laterally apart and having different angles of inclination A through the workpiece 12.

FIGS. 1 and 2 illustrate the multitude of film cooling holes which may be formed in the exemplary airfoil workpiece 12, with many of those holes having the duplex configurations 14 formed by the EDM drilling process.

As indicated above, the typical manner of forming rows of diverging film cooling holes uses the conventional EDM comb which necessarily requires identical angles of inclination in the row of diffusion holes drilled therewith.

In contrast, the airfoil workpieces 12 illustrated in FIGS. 1 and 2 include the duplex holes 14 at different angles of inclination A either in a common row along the span of the airfoil, or in rows of the duplex holes 14 along the chord of the airfoil. This varying inclination of duplex holes in a common workpiece is neither possible nor practical with conventional EDM processes.

The duplex EDM machine disclosed above therefore provides enhanced flexibility in drilling a large multitude of holes in turbine vane and blade components, for example, for further improving the cooling effectiveness of those holes and the resulting efficiency and life of the airfoil components.

Figure 7:
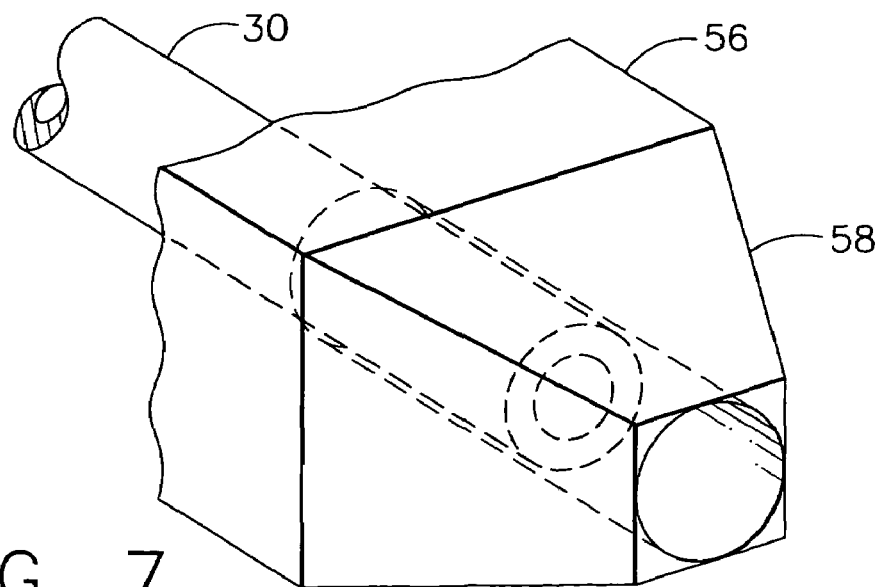
FIG. 7 is a isometric view of the distal ends of the two electrodes in accordance with another embodiment.

The versatility of the EDM machine disclosed above may be further enhanced using different forms of the duplex electrodes as practical. For example, instead of the cylindrical second electrode 32 disclosed above, a rectangular second electrode 56 as illustrated in part in FIG. 7 may be used. The rectangular electrode 56 has a corresponding rectangular or pyramidal distal end 58 which converges to its centerbore through which the cylindrical first electrode 30 is mounted. The pyramidal distal end 58 may have any suitable angle of convergence to correspondingly form the complementary diverging outlet hole in the workpiece coaxially with the cylindrical inlet formed by the first electrode 30.

The prior art in turbine airfoil cooling is replete with various forms of diffusion film cooling holes which correspondingly vary in complexity. The conical outlet hole 18 illustrated in FIGS. 2 and 5 is relatively simple in configuration and is axisymmetrical with the cylindrical inlet hole 16.

However, the second electrode 56 may have a relatively complex converging distal end 58 varying in design as desired for maximizing the diffusion performance of the diffusion film cooling holes used in turbine airfoils.

Alternatively, the second electrode may even have a simpler configuration, such as another cylindrical distal end like the plain cylindrical distal end 48 of the first electrode, except with a larger diameter. The resulting cylindrical outlet hole, or counterbore, would form a dump diffuser (not shown).

In further embodiments, the first electrode 30 could have various complex configurations, other than plain cylindrical.

The various forms of the second electrode share the common attribute of a centerbore through which the first electrode 30 is mounted for relative translation with the second electrode, and collectively the different first and second electrodes may be used for efficiently drilling duplex holes in a workpiece having different geometry, while sharing the common longitudinal or centerline axis therethrough.

The duplex EDM machine disclosed above may be conveniently modified from conventionally available EDM machines with the simple introduction of the second electrode 32 and its carriage 36, instead of typical electrode supporting guides which are not configured for conducting EDM drilling. The machine may therefore be relatively simple and have a suitable number of degrees of freedom or movement between the mounted workpiece and the coaxial electrodes.

The more degrees of freedom or movement desired in the machine typically increases the complexity and cost thereof. The increased complexity may be practical for suitable types of workpieces.

Furthermore, like typical modern EDM machines, the duplex EDM machine disclosed above may be programmed to drill a multitude of holes in a single workpiece with little or no operator intervention. The two electrodes are coordinated in operation for drilling the duplex holes relative to the common centerline axis of the electrodes while maintaining the same compound angle of inclination with the workpiece for each of the holes drilled.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An electrical discharge machine comprising:
a first electrode mounted in a first carriage for translation;
a second electrode mounted in a second carriage for translation, and being concentric with said first electrode;
a table mounted in a third carriage for positioning a workpiece under multiple axes of movement relative to said electrodes at compound angles of inclination;
a power supply for electrically powering said workpiece and electrodes;
a dielectric supply joined to said first electrode for channeling therethrough a liquid dielectric under pressure; and
a controller joined to said first, second, and third carriages, and configured for translating said first and second electrodes into said workpiece for electrical discharge drilling a coaxial duplex hole therein.

2. A machine according to claim 1 wherein:
said first electrode is tubular, and has a cylindrical distal end;
said second electrode is tubular, and has a larger distal end; and
said first electrode is disposed concentrically inside said second electrode, and is longer than said second electrode for suspending said cylindrical distal end outwardly from said larger distal end.

3. A machine according to claim 2 wherein:
said first and second carriages are configured for independent translation of said first and second electrodes, respectively; and
said third carriage is configured for independent rotation of said workpiece mounted thereon.

4. A machine according to claim 3 wherein said controller is configured for sequentially translating said first and second electrodes into said workpiece to drill said duplex hole in corresponding stages.

5. A machine according to claim 4 further comprising a rotary chuck mounted on said first carriage for supporting a proximal end of said first electrode, and joined to said controller for spinning said first electrode during drilling of said duplex hole.

6. A machine according to claim 5 wherein said controller is configured for first translating said first electrode into said workpiece to drill a cylindrical hole therein, and secondly translating said second electrode into said cylindrical hole to drill a larger outlet in said workpiece.

7. A machine according to claim 6 wherein said second electrode has a conical distal end.

8. A machine according to claim 7 wherein said second electrode is fixedly mounted to said second carriage to prevent spinning of said second electrode during drilling of said duplex hole.

9. A method of using said machine according to claim 7 comprising independently translating said first and second electrodes coaxially into said workpiece to drill said duplex hole therein.

10. A method of using said machine according to claim 7 comprising:
firstly translating said first electrode into said workpiece to drill a cylindrical hole therein; and
secondly translating said second electrode into said cylindrical hole to drill a coaxial diverging outlet in said workpiece.

11. An electrical discharge machine for drilling a workpiece comprising:
a frame containing a table to support said workpiece;
a tubular first electrode mounted in a first carriage for translation;
a second electrode mounted in a second carriage for translation, and being concentric with said first electrode;
a power supply joined to said workpiece for electrically powering said workpiece and electrodes;
a dielectric supply joined to said first electrode for channeling therethrough a liquid dielectric under pressure; and
a controller joined to said first and second carriages and configured for translating said first and second electrodes into said workpiece for electrical discharge drilling a duplex hole therein.

12. A machine according to claim 11 wherein said second electrode is tubular, and said first electrode is disposed concentrically inside said second electrode.

13. A machine according to claim 12 wherein said first electrode has a cylindrical distal end, and said second electrode has a larger distal end.

14. A machine according to claim 13 wherein said second electrode has a conical distal end.

15. A machine according to claim 13 wherein said second electrode has a pyramidal distal end.

16. A machine according to claim 13 wherein said first and second carriages are configured for independent translation of said first and second electrodes, respectively.

17. A machine according to claim 16 wherein said controller is configured for sequentially translating said first and second electrodes into said workpiece to drill said duplex hole in corresponding stages.

18. A machine according to claim 16 wherein said controller is configured for first translating said first electrode into said workpiece to drill a cylindrical hole therein, and secondly translating said second electrode into said cylindrical hole to drill a larger outlet in said workpiece.

19. A machine according to claim 13 further comprising a rotary chuck mounted on said first carriage for supporting a proximal end of said first electrode, and joined to said controller for spinning said first electrode during drilling of said duplex hole.

20. A machine according to claim 19 wherein said second electrode is elongate and supports therein a majority of said first electrode below said chuck, with said distal end of said first electrode being suspended outwardly from said distal end of said second electrode.

21. A machine according to claim 13 wherein said second electrode is fixedly mounted to said second carriage to prevent spinning of said second electrode during drilling of said duplex hole.

22. A machine according to claim 13 wherein said second electrode is rotary mounted to said second carriage to spin said second electrode during drilling of said duplex hole.

23. A machine according to claim 13 further comprising a table carriage supporting said table, and including multiple movement axes for positioning said workpiece relative to said electrodes at compound angles of inclination relative thereto.

24. A method of using said machine according to claim 13 comprising independently translating said first and second electrodes into said workpiece to drill said duplex hole therein.

25. A method of using said machine according to claim 13 comprising sequentially translating said first and second electrodes into said workpiece to drill said duplex hole in corresponding stages.

26. A method of using said machine according to claim 13 comprising:
firstly translating said first electrode into said workpiece to drill a cylindrical hole therein; and
secondly translating said second electrode into said cylindrical hole to drill a coaxial diverging outlet in said workpiece.

27. A method according to claim 26 further comprising:
spinning said first electrode during said translation thereof to drill said cylindrical hole; and
not spinning said second electrode during said translation thereof to drill said diverging outlet.

28. A method for electrical discharge machining a workpiece comprising:
coaxially translating nested and hollow first and second electrodes into said workpiece;
channeling a liquid dielectric under pressure through said electrodes to said workpiece; and
electrically powering said electrodes and workpiece for electrical discharge drilling a duplex hole into said workpiece.

29. A method according to claim 28 further comprising:
translating said first electrode inside said second electrode to initially drill a hole inside said workpiece; and
translating said second electrode over said first electrode to further drill a larger hole coaxially with said initial hole in said workpiece.

30. A method according to claim 29 wherein:
said first electrode has a cylindrical distal end, and said second electrode has a converging distal end; and
said first and second electrodes are sequentially translated into said workpiece to drill said duplex hole with a cylindrical inlet and a diverging outlet.

31. A method according to claim 30 further comprising dressing said converging distal end of said second electrode supported on said first electrode.

32. A method according to claim 30 further comprising:
spinning said first electrode during said translation thereof to drill said cylindrical inlet; and
not spinning said second electrode during said translation thereof to drill said diverging outlet.

33. A product made by the method of claim 32 comprising a plurality of said duplex holes spaced laterally apart, and having cylindrical inlets and coaxial diverging outlets at different angles of inclination through said workpiece.

* * * * *